W. REYNOLDS.
BALL BEARING MOUNTING.
APPLICATION FILED SEPT. 25, 1914.

1,158,719.

Patented Nov. 2, 1915.

WITNESSES:
René Bruine
Fred White

INVENTOR:
William Reynolds,
By Attorneys,
Fraser, Dunn & Myers

UNITED STATES PATENT OFFICE.

WILLIAM REYNOLDS, OF PATERSON, NEW JERSEY, ASSIGNOR TO THE S. K. F. BALL-BEARING CO., OF NEW YORK, N. Y., A CORPORATION OF NEW YORK.

BALL-BEARING MOUNTING.

1,158,719.      Specification of Letters Patent.      Patented Nov. 2, 1915.

Application filed September 25, 1914. Serial No. 863,453.

*To all whom it may concern:*

Be it known that I, WILLIAM REYNOLDS, a citizen of the United States of America, residing in Paterson, in the county of Passaic and State of New Jersey, have invented certain new and useful Improvements in Ball-Bearing Mountings, of which the following is a specification.

This invention aims to provide a practicable mounting for ball bearings for shafts which shall form a lubricating chamber such that the balls may travel in a lubricating medium, such as grease or oil. The provision of such a chamber involves difficulty in making a close joint at the opening through which the shaft passes, so as to prevent the entrance of water, dust, grit, or other deleterious substances, while at the same time allowing the necessary amount of freedom of motion for the shaft, which should be free to wabble or gyrate. To provide for this condition the grease chamber is composed of rigid walls appurtenant to the stationary bearing while the end walls encircling the shaft are formed each of an annular sheet of suitable flexible material fastened at its outer margin to the rigid wall, and at its inner margin to a stuffing ring which makes free running but leak-tight contact with a ring or collar fastened on the shaft. This collar is embraced between two rings fastened together from opposite sides and forming a composite ring to which the inner margin of the flexible wall or diaphragm is attached. The stuffing rings are thus respectively revolving and stationary, their rubbing contact carrying no load and being efficiently lubricated by an oozing of lubricant from the chamber; while any wabbling motion is allowed for by the flexibility of the diaphragm.

The accompanying drawings show the preferred embodiment of the invention.

Figure 1:
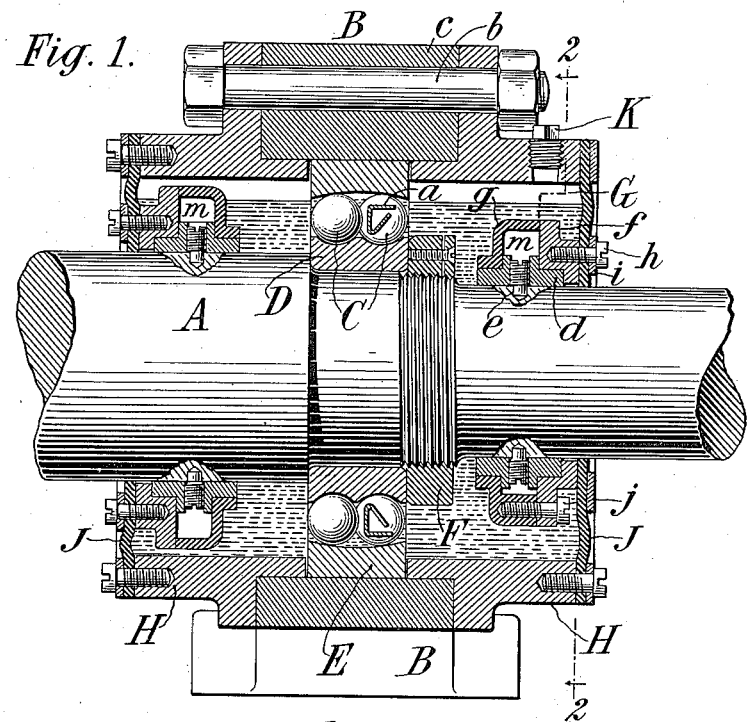
Figure 2:
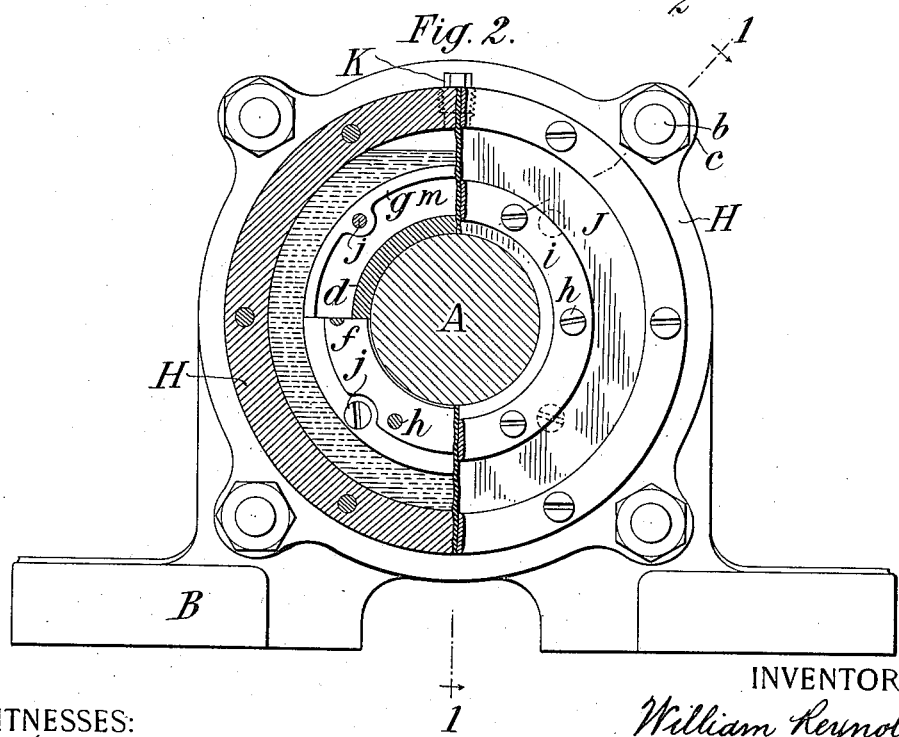

Figure 1 is a longitudinal section, being mainly in a vertical plane, but partly in an oblique plane, as shown by dotted line 1—1 in Fig. 2. Fig. 2 is a transverse section, the right half showing the bearing in elevation, while the left half is in section in the two planes denoted by the line 2—2 in Fig. 1.

A is the shaft and B is the main stationary member of the bearing which may be in the form of a pillow block, or if inverted a hanger, or any other form which may be desired.

C C are the respective rows or series of balls which travel as usual in race-ways formed in the inner and outer concentric rings D and E respectively.

The particular ball bearing here shown is the well-known SKF bearing, and requires no description.

At $a$ is shown a ball spacer which may be used, or not, as desired. The ring D is shown as attached to the shaft by a screw collar F. The ring D is thus essentially a part of the shaft, and might conceivably be formed as an integral collar thereon. The ring E is shown as mounted fixedly within the bearing B, and might conceivably be made integral therewith. The particular ball bearing construction thus far described is shown merely as an illustration, and forms no part of the present invention.

To form the grease chamber G the bearing is provided with rigid walls H H extending in contrary directions around the shaft. For convenience these are made as rings separate from the bearings B, but this is not essential as conceivably these parts might be integral. The annular walls H H are shown as fastened by bolts $b$ $b$ which pass through ears $c$ $c$ formed on the bearing B; but any other attachment may be substituted. The ends of the grease chamber are formed of flexible diaphragms J J preferably of water-proof leather. These are fastened at their outer margins to the walls H H respectively. At their inner margins each diaphragm is fastened to a stationary member of the stuffing rings. These rings comprise a revolving ring or member $d$ which constitutes a collar on the shaft, being fastened thereto by screws $e$; and stationary rings or members $f$ and $g$, the ring $f$ being the one to which the inner margin of the diaphragm is fastened as by screws $h$ through a ring $i$; while the ring or member $g$ mates the ring $f$ and is fastened thereto by screws $j$. The rings $f$ $g$ embrace between them a portion of the collar $d$ forming an outward rib, and having bearings upon the cylindrical faces of the collar, so that the latter turns freely within them. The joint thus formed is substantially leak-tight, but admits sufficient lubricant to render the rubbing contact practically frictionless. The rings *f g* being carried solely by the collar *d* and diaphragm J are free to participate in the gyrating or wabbling movement of the shaft, the flexure of the diaphragm permitting this and also providing for the centering of the rings on the shaft, if the position of the latter be eccentric to that which would be assumed by the stuffing rings. The rings *f g* preferably extend beyond the perimeter of the rib on the ring *d* so as to form an annular chamber *m;* this chamber becomes filled with the lubricant and assists in the making of a suitable leak-tight joint.

Grease or oil may be introduced into the chamber G through a screw plug or cap K. If grease be used, it may be filled to the level shown; oil would usually be at a lower level.

While the construction is that deemed preferable, it may be greatly varied in matters of detail without departing from the essential features of the invention.

I claim as my invention:—

1. A shaft bearing comprising balls, members having race-ways and an inclosing member, the latter having a chamber for lubricant comprising a flexible diaphragm forming an end of said chamber, and stuffing rings encircling the shaft, one member thereof fastened as a collar upon the shaft and turning within another stationary member thereof, to which is fastened the inner margin of said diaphragm, while its outer margin is fastened to said inclosing member.

2. A shaft bearing comprising balls, members having race-ways and an inclosing member, the latter having an annular wall inclosing the shaft, and a flexible diaphragm, inclosing a chamber for lubricant, and stuffing rings encircling the shaft, one member thereof fastened as a collar upon the shaft and other stationary members encircling and embracing such collar to form therewith a practically leak-tight joint, said diaphragm fastened at its inner margin to the stationary members of such stuffing rings and at its outer margin to said wall.

3. A shaft bearing comprising balls, members having race-ways and an inclosing member, the latter comprising an annular wall inclosing the shaft, and a flexible diaphragm, inclosing a chamber for lubricant, and stuffing rings encircling the shaft, one member thereof fastened as a collar upon the shaft and having an annular rib, and two stationary members thereof, encircling said collar and embracing between them the rib thereof, fastened together and fastened to the inner margin of said diaphragm, and the outer margin of the latter fastened to said wall.

4. A shaft bearing comprising balls, members having race-ways, and an inclosing member, the latter comprising a rigid wall encircling the shaft, and a flexible diaphragm, inclosing a chamber for lubricant, and stuffing rings encircling the shaft, one member thereof fastened as a collar upon the shaft, and two stationary members encircling said collar, fastened together from opposite sides, and forming around said collar an annular chamber, and said diaphragm fastened at its inner margin to said stationary rings and at its outer margin to said rigid wall.

5. A shaft bearing comprising balls, members having race-ways, and an inclosing member comprising a bearing part, annular walls fastened to opposite sides thereof, and flexible diaphragms applied to the outer ends of said walls and forming therewith a chamber for lubricant, and stuffing rings encircling the shaft, one member of each fastened as a collar upon the shaft and other stationary members encircling such collar, each diaphragm fastened at its inner margin to such stationary member and at its outer margin to said wall.

6. A shaft bearing comprising walls and rings having race-ways, the shaft fastened within the inner ring, a main bearing member encircling the outer ring, rigid annular walls fastened against opposite sides of said bearing member on opposite sides of said outer ring, flexible diaphragms applied to the outer ends of said walls and forming therewith a chamber for lubricant, and stuffing rings encircling the shaft, one member of each fastened as a collar upon the shaft and other stationary members encircling such collar, each diaphragm fastened at its inner margin to such stationary member and at its outer margin to said wall.

In witness whereof, I have hereunto signed my name in the presence of two subscribing witnesses.

WILLIAM REYNOLDS.

Witnesses:
ALBIN SMITH,
JAMES A. HARMON.